United States Patent [19]
Takahashi et al.

[11] Patent Number: 5,713,028
[45] Date of Patent: Jan. 27, 1998

[54] MICRO-PROCESSOR UNIT HAVING UNIVERSAL ASYNCHRONOUS RECEIVER/TRANSMITTER

[75] Inventors: Yutaka Takahashi; Toshihiro Ibuka, both of Sendai, Japan

[73] Assignee: Fujitsu Limited, Kawasaki, Japan

[21] Appl. No.: 524,303

[22] Filed: Sep. 6, 1995

[30] Foreign Application Priority Data

Jan. 30, 1995 [JP] Japan ................................ 7-012176

[51] Int. Cl.⁶ ............................................ G06F 1/32
[52] U.S. Cl. ........................................ 395/750; 395/560
[58] Field of Search ................................ 395/750, 550, 395/310, 309, 286, 800, 883, 892, 560, 559, 556

[56] References Cited

U.S. PATENT DOCUMENTS

| | | | |
|---|---|---|---|
| 5,392,437 | 2/1995 | Matter et al. | 395/750 |
| 5,418,969 | 5/1995 | Matsuzaki et al. | 395/750 |
| 5,452,434 | 9/1995 | MacDonald | 395/550 |
| 5,546,590 | 8/1996 | Pierce | 395/750 |

FOREIGN PATENT DOCUMENTS

666529A1  8/1995  European Pat. Off. .......... G06F 1/32

*Primary Examiner*—Glenn A. Auve
*Attorney, Agent, or Firm*—Greer, Burns & Crain, Ltd.

[57] ABSTRACT

A UART (Universal Asynchronous Receiver/Transmitter) is used to interface serial data signals, and is provided to associate with a micro-processor in a micro-processor unit. The micro-processor unit is required to save consumption of power, if employed in such devices as a handy terminal device or the like. The micro-processor unit that can save consumption of power includes a microprocessor having a core section, which performs an arithmetic operation, and a universal asynchronous receiver/transmitter section operatively connected to the core section of the micro-processor. The universal asynchronous receiver/transmitter has a first circuit for receiving an asynchronous serial data signal, which is composed of a start bit, a stop bit and data bits provided between the start and stop bits. The first circuit also detects the start bit. Also included in the universal asynchronous receiver/transmitter is a second circuit for setting a flag indicating that the asynchronous serial data signal is being received when the start bit is detected by the first. When the micro-processor detects that the flag is set, stops the supply of clocks to the core section in a sleep mode.

7 Claims, 5 Drawing Sheets

MICRO-PROCESSOR UNIT HAVING UNIVERSAL ASYNCHRONOUS RECEIVER/TRANSMITTER

BACKGROUND OF THE INVENTION

1. Field of the Invention

The present invention relates to a micro-processor unit having a universal asynchronous receiver/transmitter circuit (UART). More particularly, it relates to a micro-processor unit having a micro-processor (CPU) and a UART, which is associated with the CPU and is formed to save consumption of power, so that the micro-processor unit can be suitably employed in a handy telephone or the like, which requires to small power consumption.

2. Description of the Related Art

When a CPU (micro-processor) interfaces with peripheral circuits, communication is generally made via asynchronous start-stop type serial data. In this case, a UART (Universal Asynchronous Receiver/Transmitter) is widely employed as a receiver/transmitter circuit, which has a function of interfacing and is applicable to every asynchronous communication.

This is because communications is made easy by programming the same protocol on facing UARTs. The operation in the UART is performed in accordance with RS-232C standard of EIA.

In recent years, integration of circuits has been developed. Therefore, there has been a tendency to switch from the use of a structure in which a CPU (micro-processor) and a UART are separately mounted to the use of another structure in which the CPU and a peripheral device, such as the UART, are mounted on one chip. More particularly, the UART has been unitedly built-in most of micro-controllers, which have more than 8 bits operation.

Accordingly, an asynchronous serial communication is employed for inter-CPU communication in devices which employ two or more CPUs. More particularly, a dual CPU structure having a CPU for line control and another CPU for MMI (Man Machine Interface) is widely employed in movable communication terminals, such as a mobile telephone and a handy telephone.

Therefore, interfacing is performed by employing UARTs, respectively built in the both CPUs. After setting a communication protocol On the UARTs, data are stored and extracted to/from registers according to an IRQ (Interruption Request). Thus, it makes easy to program the protocol for the UART according to a specification required. Further, communication by using the UART has a long history and experiences, and assets of know-how for programs are widely known, so that there is an advantage in using such assets for programming communication protocols.

After liberalization of communication, users' demand for movable communication terminals has been changed from the mobile telephone to the handy telephone. However, the handy telephone needs a battery as a source of electric power supply, and it is very important for using the telephone for a long time to consider power savings on each of a plurality of circuit blocks in the handy telephone.

A CPU generally can save power by being used in a power saving mode. The consumption of power of an Integrated Circuit (IC) increases in proportion to frequencies of clocks used inside. Therefore, the CPU, as an IC, can save power by stopping the internal clock in the power saving mode.

FIG. 5 shows a block diagram of a conventional CPU having a built-in UART. In FIG. 5, a CPU core 10 is an arithmetic processing section, which is a main part of the CPU. An address decoder 11 decodes address data transmitted from the CPU core 10 and converts the data to an address for reading data sent from UART macro section 12.

The UART macro section 12 has a pre-scaler 20 that generates clock signals, which are supplied to several sections of the CPU based on a basic clock CLK. Further, in FIG. 5, the reference numeral 30 denotes a receiving controller and 31 is a receiving shift controller. An asynchronous start/stop type synchronous serial data sent from a faced UART, which is a part of another CPU of a dual CPU structure, not shown in FIG. 5, are input to the receiving shift controller 31, and the receiving shift controller 31 detects start and stop bits and sends them to the receiving controller 30.

Then, data presented between the start and stop bits are branched from the receiving shift controller 31, and sent to the CPU core 10. When the receiving controller 30 detects the completion of receipt of data in the receiving shift controller 31, the controller 30 sends an IRQ for completion of receipt of data to the CPU core 10. When an error is generated during receiving of data, an IRQ for "error" is sent to the CPU core 10.

The sending controller 40 and the sending shift controller 41 send serial data from the CPU core 10 to the faced CPU. Further, the reference numeral 50 is an I/O section, 51 is an edge detector, and 52 is a latch circuit.

In the prior art, the receiving controller 30 would neither generate an interruption request (IRQ) nor change a status flag (FG), until the UART macro section 12 completes receiving one frame of data.

Accordingly, the CPU core 10 cannot confirm an existence of received data, namely, whether or not the UART macro section 12 is under receiving operation. Further, in the case where the CPU core 10 is moved to a power saving mode while the UART macro section 12 is under receiving operation, the clock supply to the UART macro section 12 is stopped. Thus, a fault is generated.

To overcome such drawbacks, the edge detector 51 and the latch circuit 52 are added in the conventional structure as shown in FIG. 5. The edge detector 51 detects an edge of serial data, and inputs a detected edge signal to an external IRQ terminal of the CPU core section 10. The CPU core section 10, is then allowed to recognize the status of inputting data being inputted.

Further, when the external IRQ terminal of the CPU core section 10 is occupied by other inputs, the latch circuit 52 latches the detected output of the edge detector 51, and sends modification of status of the latch circuit 52, that is, status of data being input, to an I/O port of the I/O section 50. Thus, the CPU core section 10 can recognize the status of data being input, by means of software polling through the I/O section 50.

However, when the edge detector 51 and the latch circuit 52 are employed as explained above, it may well be that other processing functions are terminated and normal processing disrupted because most upper leveled IRQ (external IRQ) is driven whenever the data changes to zero.

Further, it becomes necessary to provide the edge detector 51 and the latch 52 which add to the total number of required components. When using the system that recognizes the status of receiving by the means of the software polling processing, there is no undesirable effect on the processing of the MPU. However, it is also required to provide additional external devices.

SUMMARY OF THE INVENTION

Accordingly, it is an object of the present invention to provide a MPU (micro-processor unit) having a UART, which is used accompanied with a CPU (micro-processor), is not required to provide external circuits, and gives no undesirable effect on a normal operation of the MPU in a power saving mode of devices.

The microprocessor unit according to the present invention includes a macro cell for a UART (universal asynchronous receiver/transmitter) and a CPU. The macro cell for the universal asynchronous receiver/transmitter has a detector for detecting a start bit of asynchronous serial data and a receiving controller for sending an IRQ (interruption request) for "starting to receive data" to the CPU at the time the start bit is detected.

When the IRQ for starting to receive data is detected, the supplement of clocks to the CPU is stopped in a sleeping mode. By this structure, it is possible to see the operation status of the universal asynchronous receiver/transmitter in concurrence with the processing of a main program on the CPU.

When a real time OS controls the power saving mode, the real time OS is built-in the CPU, and the real time OS controls the power saving processing based on the IRQ signal for starting to receive data.

Therefore, there is no need to provide an external status detector, which has been typically required in conventional CPUs to see the operation of the universal asynchronous receiver/transmitter.

The universal asynchronous receiver/transmitter further comprises a detector for detecting a start bit of asynchronous serial data and a status register for setting a flag indicating that data are being received at the time of detecting the start bit. The CPU stops the supply of clocks to the CPU core section 10 in a sleeping mode according to the existence of the set flag. The CPU further recognizes the set status of the flag by polling.

In this structure, a small scaled micro-processor unit, in which a real time OS is hard to store, can recognize the setting of a flag indicating data are being received by means of polling. In this case, it also becomes no need to provide any external status detector, which is required to see the operation of a universal asynchronous transmitter/receiver.

More particularly, as an applied embodiment of the present invention, a universal asynchronous receiver/transmitter and a CPU are respectively formed on the same integrated semiconductor chip, as a macro cell for the universal asynchronous receiver/transmitter and a CPU cell.

It is possible to avoid generating faults during receiving of data in a universal asynchronous receiver/transmitter by power saving processing according to the above-described feature of the present invention, even if the universal asynchronous receiver/transmitter and a CPU are unitedly formed on the same integrated semiconductor chip.

More objects and features of the present invention will be clear by the following description of the embodiments and the accompanied drawings.

DESCRIPTION OF THE PREFERRED EMBODIMENTS

Figure 1:
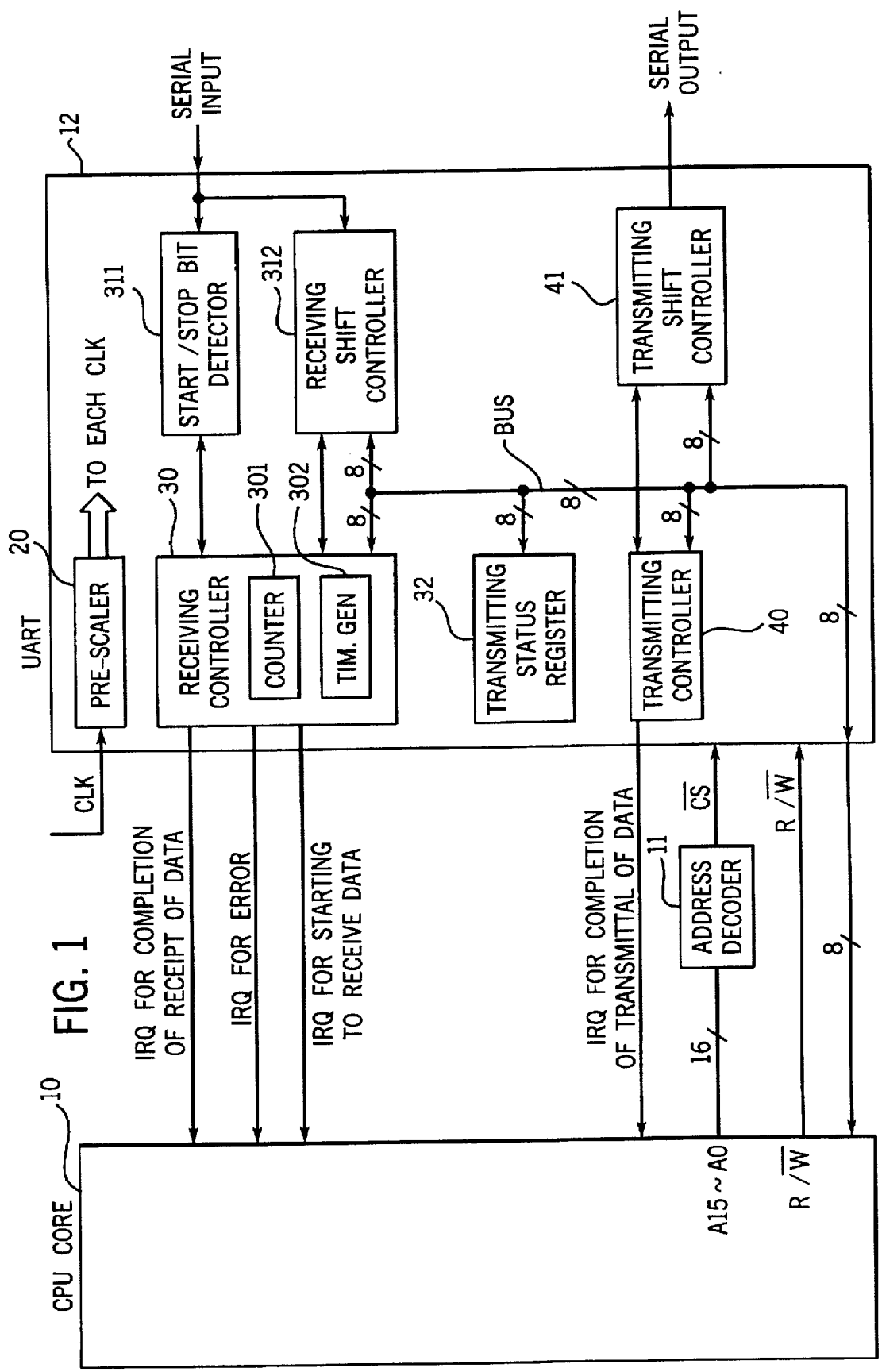
FIG. 1 is a block diagram of one embodiment according to the present invention.

FIG. 1 illustrates a block diagram of one structural example of a MPU (micro-processor unit) having a UART, which is formed on a semiconductor chip, according to the present invention.

In FIG. 1, reference numeral "10" is a CPU core, which is the main section of a MPU (micro-processor unit), "12" is a UART, which is formed by a macro cell on the semiconductor chip (hereinafter referred to as a UART macro section).

In this embodiment, the MPU (micro-processor unit) having a UART function is employed, for example, in handy phones. More particularly, when a CPU for controlling lines and a CPU for MMI (man machine interface) are employed, transmitting and receiving of signals are performed between the CPUs, via UARTs respectively provided to associate with the CPUs.

The UART macro section 12 has a pre-scaler 20 that generates clock signals, which are supplied to each section, based on a base clock CLK.

Figure 5:
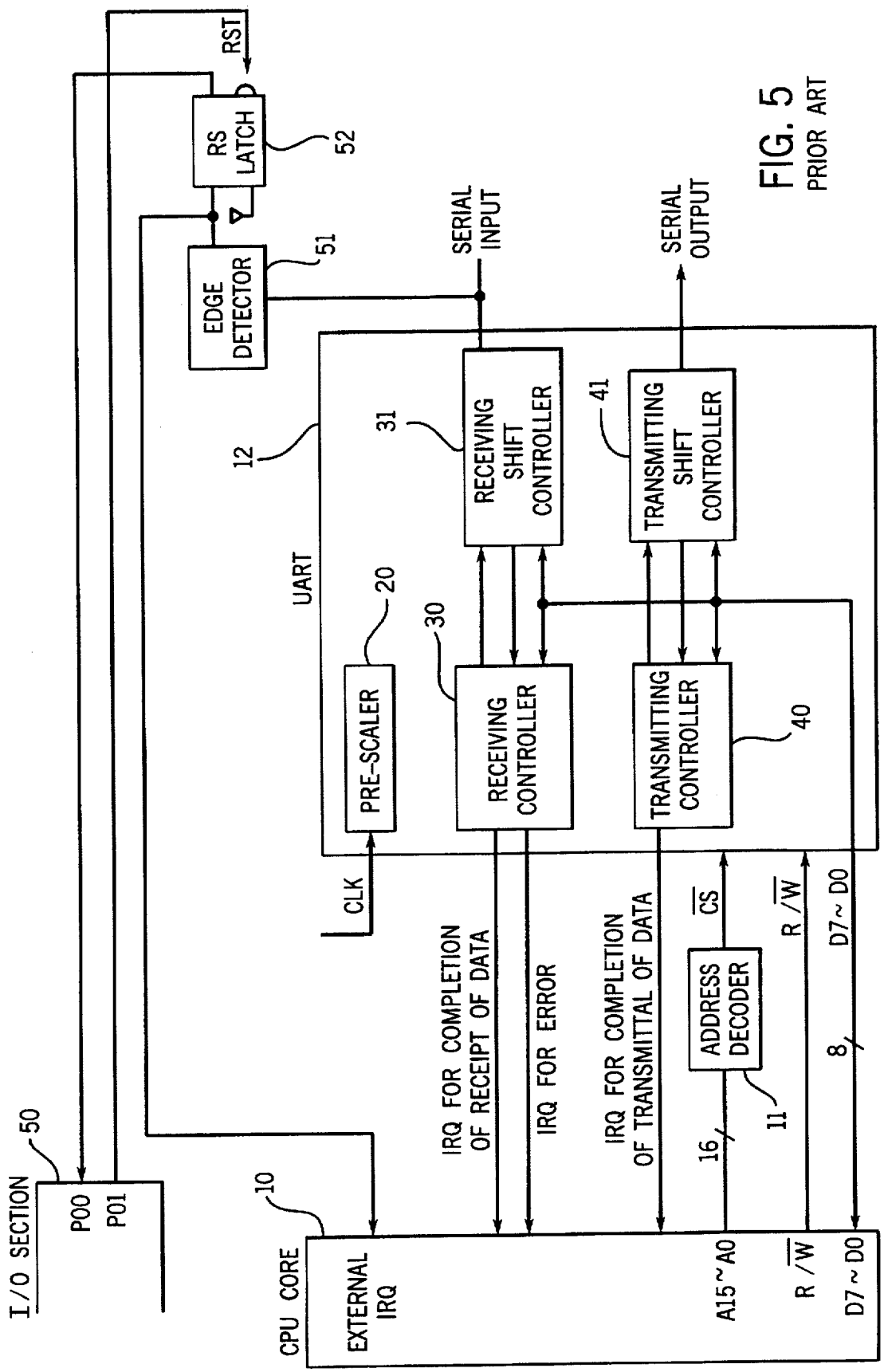
FIG. 5 shows a prior art CPU.

Further, a receiving controller 30 has a counter 301 and a timing signal generator 302. The receiving shift controller 31 shown in FIG. 5, which is explained as a prior art, has a start/stop bit detector 311 and a receiving shift latch circuit 312 in the embodiment of the present invention shown in FIG. 1.

Figure 2:
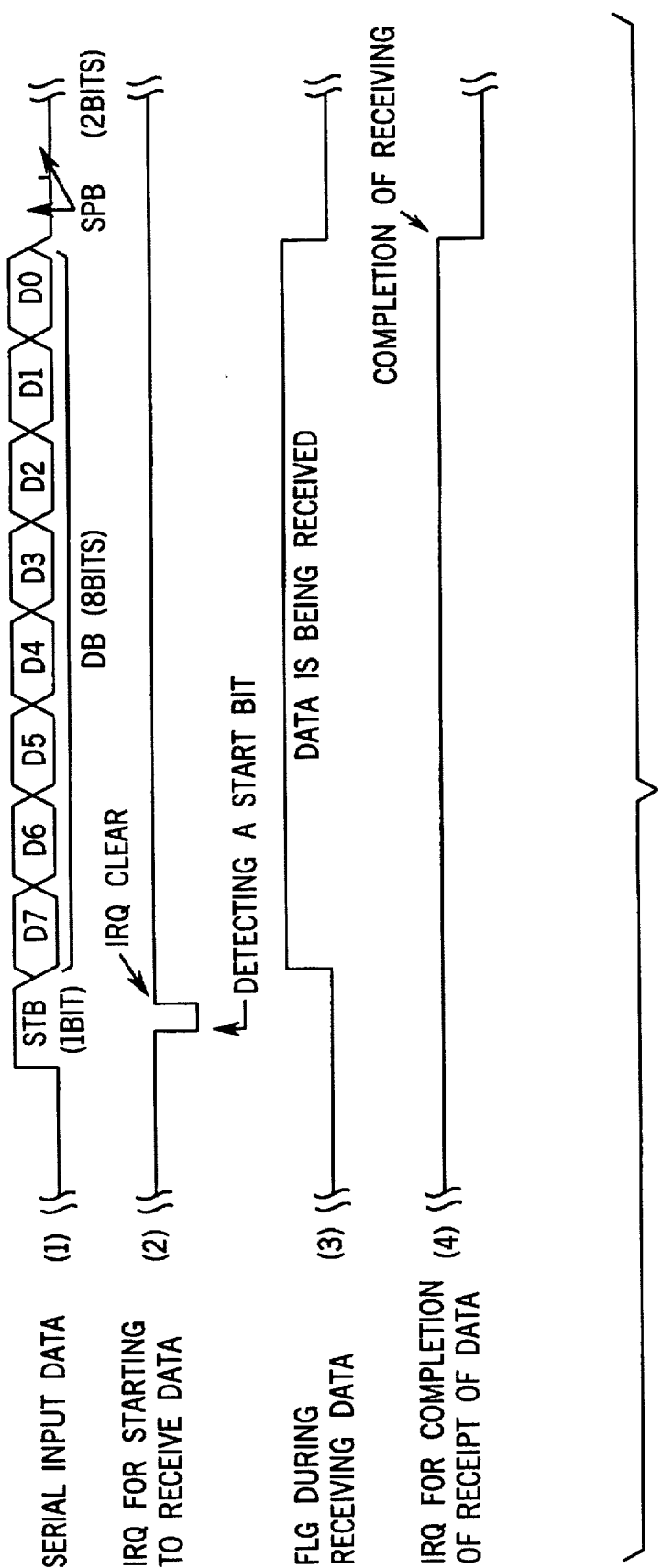
FIG. 2 is a time chart of the embodiment shown in FIG. 1.

In this embodiment, serial data input from a faced UART, which is not shown in FIG. 1 form asynchronous start-stop type serial signals as shown in FIG. 2 (refer to (1) of FIG. 2). The serial signals include one bit of a start bit STB, 8 bits of data DB (D7 to D0), and 2 bits of stop bit SPB.

When the start-stop type serial signal is input to the start/stop bit detector 311, a plurality of samplings are performed for one bit period, and the first bit of the serial signals can be detected.

When the start bit STB is detected, a detected signal is sent to the receiving controller 30. The receiving controller 30 outputs an IRQ for "starting to receive data" to the CPU core section 10 (refer to (2) of FIG. 2). After detecting the start bit STB, the counter 301 of the receiving controller 30 counts timing signals sent from the timing signal generator 302. Further, the receiving controller 30 drives the receiving shift latch circuit 312 to start at a predetermined timing, based on the counted timing signals. Then, the controller 30 receives 8 bits of the data DB from the receiving shift latch circuit 312.

Further, when the start/stop bit detector 311 detects a stop bit SPB, the receiving shift latch circuit 312 latches the stop bit SPB and outputs it to 8 bit data buses BUS.

Simultaneously, the receiving controller 30 sets a flag FG showing the status of receiving data in the status register 32 during the period between the start bit STB and the stop bit SPB (refer to (3) of FIG. 2). Thereby, it is possible to inform of the flag FG in the status register 32 via a data bus BUS to the CPU core section 10.

The receiving controller 30 stops the operation of the receiving shift latch 312 by the detection of the stop bit SPB, and outputs the IRQ for completion of receipt of data to the CPU core section 10 (refer (4) of FIG. 2). Accordingly, in the embodiment shown in FIG. 1, the CPU core section 10 is allowed to recognize the statuses of starting to receive data, receiving data and completing of receipt of data for the serial data inputted at any timing. Therefore, it becomes possible to avoid faults which are typically generated due to the power saving processing in the conventional circuit.

Figure 3:
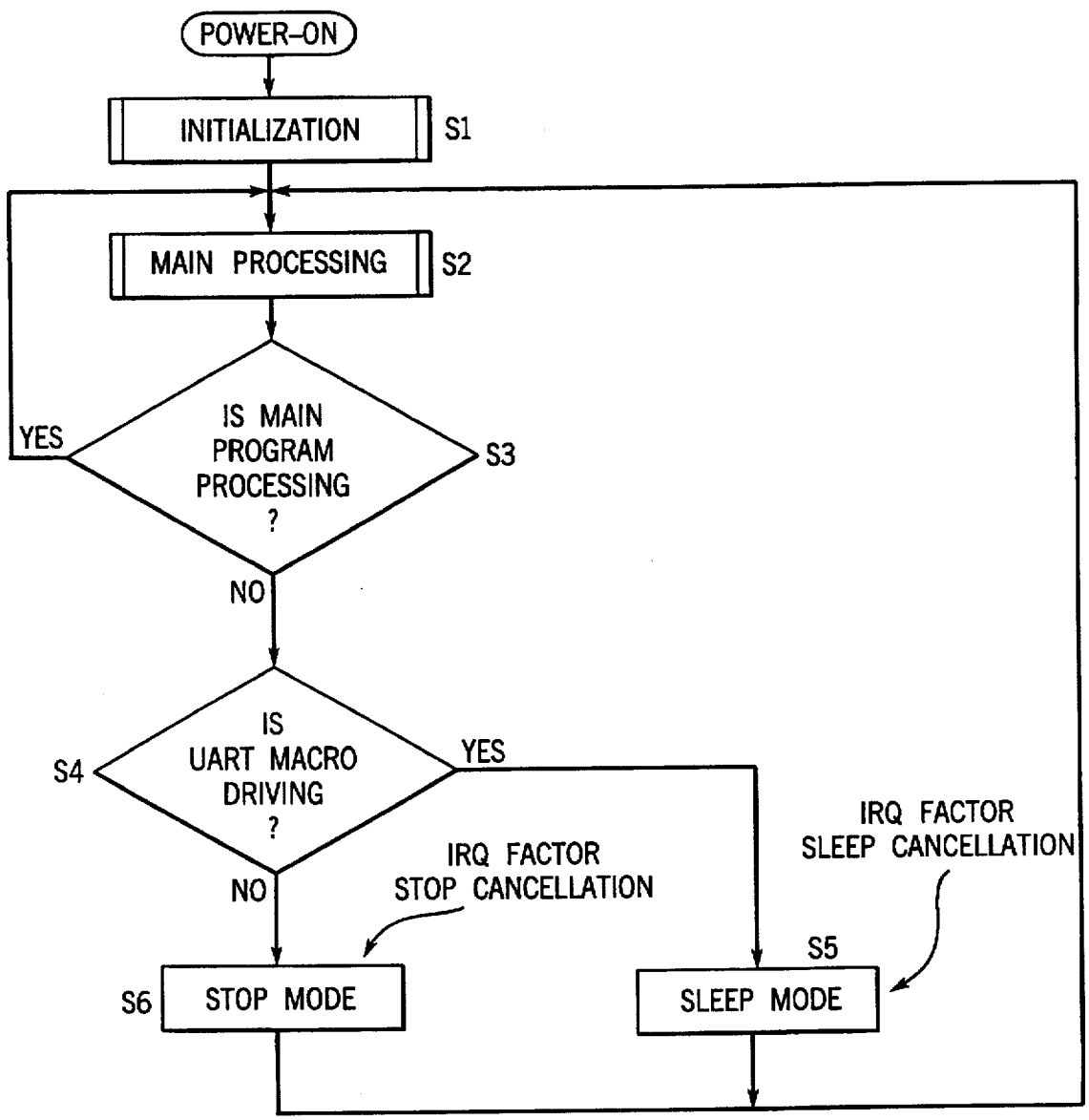
FIG. 3 is an operational flow chart illustrating detection of the status by a flag FG during a receiving data process.

FIG. 3 shows an operational flow chart when the above-described CPU core section 10 detects the status of receiving data according to the flag FG. At first, the entire system is initialized (STEP S1). Then, when main processing in the CPU core section 10 (STEP S2) is not for a main program (STEP S3:NO), it is judged whether or not the UART macro section 12 is under operation (STEP S4).

It becomes possible by detecting the flag FG in the status register 32, which is described above with respect to FIG. 1, to judge whether or not the UART macro section 12 is being driven.

When the UART macro section 12 is driving, the supply of clocks CLK is stopped only for the CPU core section 10 according to a sleep mode (STEP S5), whereas the supply of clocks CLK is stopped, under a stop mode, for both the CPU core section 10 and the UART macro section 12, when the UART macro section is not driving (STEP S6).

In FIG. 3, it is possible to cancel the sleeping mode (STEP S5) and the stop mode (STEP S6) according to the interruption request (IRQ) during processing in both modes.

Figure 4:
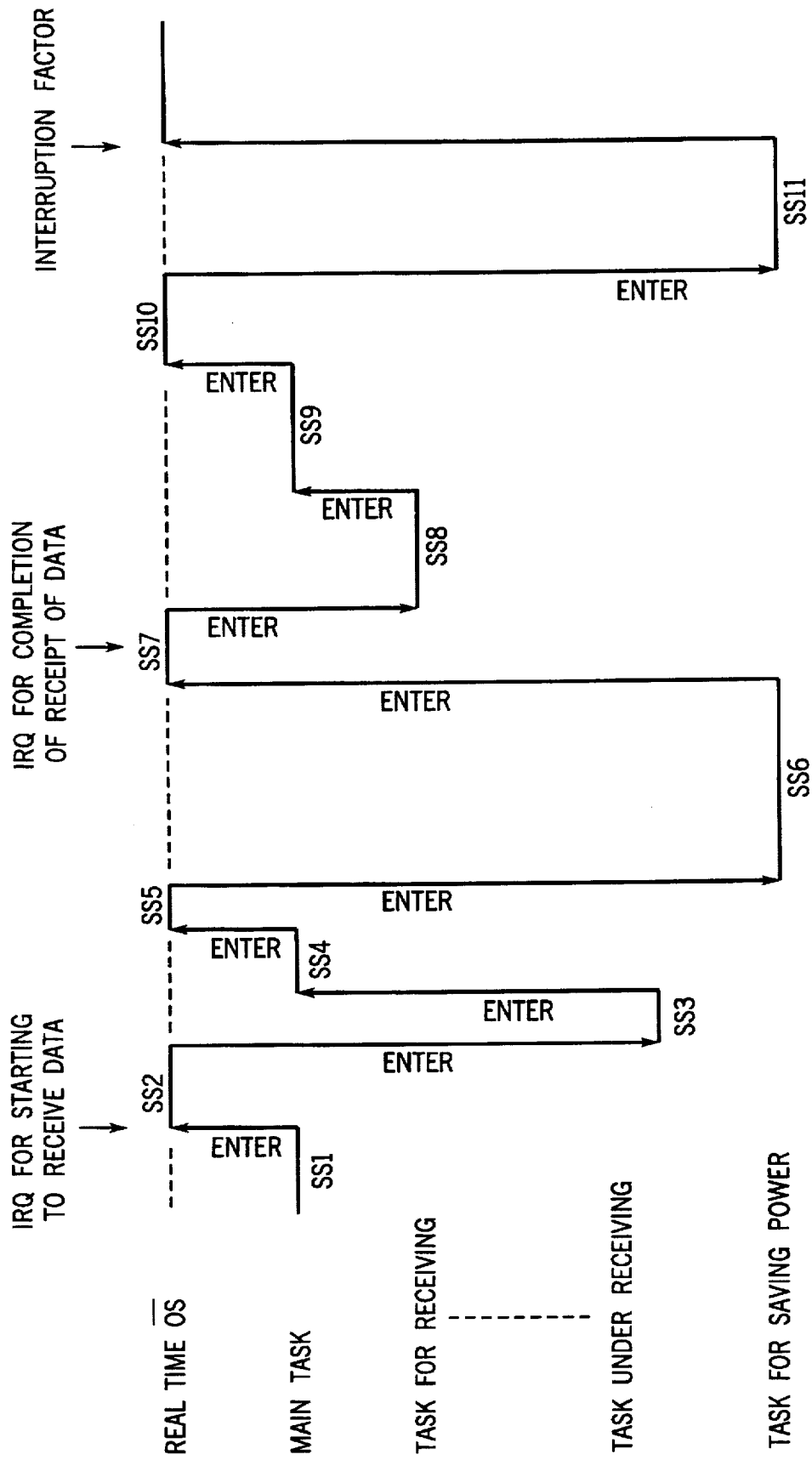
FIG. 4 is a control sequence flow chart of a CPU when using IRQ during the receiving data process by OS.

FIG. 4 is an explanatory diagram of control sequence of the CPU core section 10 when employing IRQ in the process of receiving data according to an Operating System (OS) stored in a software module provided on a semiconductor chip.

In FIG. 4, the CPU core section 10 receives (SS2) an IRQ for starting to receive data from the main task (SS1). Thereby, the main task is moved to the task for receiving data, and the suppression of stop mode (DISABLE) is set (SS3). Accordingly, it becomes possible to continue receiving serial data in the UART 12 without faults.

Then, returning to the main task, and the main processing is performed in the CPU core section 10 (SS4). After the main processing (SS4), scanning processing is performed by the OS (SS5). When it is detected that other tasks except power save task are stopped, the task is moved to the power save task (SS6), and the sleeping mode is set.

When the UART macro section 12 completes receiving data, an IRQ driver in the OS is started (SS7) and the process for receiving the data received from the receiving controller 30 is moved to the receiving task performed by the CPU core section 10 (SS8). In the receiving task (SS8), the received data is analyzed and the suppression of stop mode (DISABLE) is canceled.

Then, the main processing is performed (SS9). After that, the process is moved to OS (SS10). In this step, scanning processing is performed by OS as well as the above-described OS processing. When it is detected that a task except the power save task is stopped, the stop mode is set (SS11), the supply of clocks CLK for the CPU core section and the functional macro are stopped.

In accordance with a preferred embodiment of the present invention, a micro-processor unit, in which units a UART and a CPU are included, does not generate any fault even when the UART is receiving in the power saving mode.

Further, no external device is required to obtain the above-described effect, and it is also improved to handle the UART in the real time OS.

What is claimed is:

1. A micro-processor unit comprising:
   a micro-processor having a core section, which performs an arithmetic operation; and
   a universal asynchronous receiver/transmitter section operatively connected to the core section of the micro-processor, having,
   first means for receiving an asynchronous serial data signal, which is composed of a start bit, a stop bit and data bits provided between the start and stop bit and for detecting the start bit, and
   second means for setting a flag indicating that the asynchronous serial data signal is being received when the start bit is detected by the first means,
   the micro-processor detecting the flag being set, and stopping supply of clocks to the core section in a sleep mode.

2. The micro-processor unit according to claim 1, wherein the micro-processor stops supply of clocks to the core section and the universal asynchronous receiver/transmitter section in a stop mode, if the flag is not set.

3. The micro-processor unit according to claim 2, wherein the first means sends an interruption request to the micro-processor when the first means detects the start bit, and the micro-processor further has a software module storing a real time Operating System (OS), which controls a power saving procedure including stopping of the supply of clocks to the core section and the universal asynchronous receiver/transmitter section when the interruption request is received.

4. The micro-processor unit according to claim 1, wherein the first means sends an interruption request to the micro-processor when the first means detects the start bit, and the micro-processor further has a software module storing a real time Operating System (OS), which controls a power saving procedure including stopping of the supply of clocks to the core section.

5. The micro-processor unit according to claim 1, wherein the universal asynchronous receiver/transmitter section performs a plurality of samplings for one bit period of the received asynchronous serial data signal to detect the start bit.

6. The micro-processor unit according to claim 1, wherein the universal asynchronous receiver/transmitter section further has a register in which the flag indicating that the asynchronous serial data signal is being received is set, and the micro-processor sends a polling signal to the universal asynchronous receiver/transmitter section to detect the status of the register.

7. The micro-processor unit according to claim 1, wherein the micro-processor and the universal asynchronous receiver/transmitter section are formed on a semiconductor chip as a CPU cell and a macro cell, respectively.

* * * * *

UNITED STATES PATENT AND TRADEMARK OFFICE
CERTIFICATE OF CORRECTION

PATENT NO. : 5,713,028
DATED : January 27, 1998
INVENTOR(S) : Takahashi et al.

It is certified that error appears in the above-identified patent and that said Letters Patent is hereby corrected as shown below:

Column 1, line 14, delete "requires to" and insert --requires-- therefor

Column 1, line 46, delete "On" and insert --on-- therefor

Column 2, line 20, delete "completion" and insert --"completion-- therefor

Column 2, line 21, delete "data" and insert --data"-- therefor

Column 2, line 31, delete "an"

Column 3, line 39, delete "it also becomes" and insert --there also is-- therefor

UNITED STATES PATENT AND TRADEMARK OFFICE
CERTIFICATE OF CORRECTION

PATENT NO. : 5,713,028
DATED : January 27, 1998
INVENTOR(S) : Takahashi et al.

It is certified that error appears in the above-identified patent and that said Letters Patent is hereby corrected as shown below:

Column 4, line 7, delete " "10" " and insert --10-- therefor

Column 4, line 8, delete " "12" " and insert --12-- therefor

Column 4, line 44, delete "timing," and insert --time,-- therefor

Column 4, line 52, delete "receiving data" and insert --"receiving data"-- therefor Column 4, line 60, delete "completion of receipt of data" and insert --"completion of receipt of data"-- therefor Column 4, line 60, after "refer" insert --to--

UNITED STATES PATENT AND TRADEMARK OFFICE
CERTIFICATE OF CORRECTION

PATENT NO. : 5,713,028
DATED : January 27, 1998
INVENTOR(S) : Takahashi et al.

It is certified that error appears in the above-identified patent and that said Letters Patent is hereby corrected as shown below:

Column 4, line 63, delete "starting to receive data" and insert --"starting to receive data"-- therefor Column 4, line 64, delete "completing of receipt of data" and insert --"completion of receipt of data"-- therefor Column 5, line 14, delete "55" and insert --S5-- therefor Column 5, line 17, delete "56" and insert --S6-- therefor

UNITED STATES PATENT AND TRADEMARK OFFICE
CERTIFICATE OF CORRECTION

PATENT NO. : 5,713,028
DATED : January 27, 1998
INVENTOR(S) : Takahashi et al.

It is certified that error appears in the above-identified patent and that said Letters Patent is hereby corrected as shown below:

Column 5, line 19, delete "56" and insert

--S6-- therefor

Column 5, line 36, delete "0S" and insert

--OS-- therefor

Column 5, line 52, after "section" insert

--10--

Column 5, line 55, delete "units"

Signed and Sealed this

Twenty-seventh Day of October, 1998

Attest:

BRUCE LEHMAN

*Attesting Officer*    *Commissioner of Patents and Trademarks*